United States Patent
Juestel et al.

(10) Patent No.: US 6,570,319 B2
(45) Date of Patent: May 27, 2003

(54) SOFT-TONE FLUORESCENT LAMP

(75) Inventors: Thomas Juestel, Aachen (DE); Hans Nikol, Eindhoven (NL); Cornelis Jojakim Jalink, Eindhoven (NL); Wolfgang Busselt, Roetgen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 195 days.

(21) Appl. No.: 09/761,233

(22) Filed: Jan. 16, 2001

(65) Prior Publication Data

US 2002/0008462 A1 Jan. 24, 2002

(30) Foreign Application Priority Data

Jan. 18, 2000 (DE) .......................... 100 01 763

(51) Int. Cl.<sup>7</sup> ................................. H01J 1/63
(52) U.S. Cl. ..................... 313/485; 313/487

(58) Field of Search ................... 313/485, 223, 313/229, 225, 226, 25, 487

(56) References Cited

U.S. PATENT DOCUMENTS

| 3,824,423 A | * | 7/1974 | Pappalardo et al. | ........ 313/225 |
| 4,469,980 A | * | 9/1984 | Johnson | ........ 313/25 |
| 4,623,816 A | * | 11/1986 | Hoffman et al. | ........ 313/487 |
| 4,670,688 A | * | 6/1987 | Sigai et al. | ........ 313/489 |
| 5,652,067 A | * | 7/1997 | Ito et al. | ........ 428/690 |
| 5,709,578 A | * | 1/1998 | Hatsutori et al. | ........ 445/26 |

* cited by examiner

Primary Examiner—Quana M. Grainger
(74) Attorney, Agent, or Firm—Dicran Halajian

(57) ABSTRACT

A gas discharge lamp has two electrodes and a gastight, transparent lamp envelope including a filling gas containing mercury and a phosphor coating. The phosphor coating contains a perylene pigment.

7 Claims, 1 Drawing Sheet

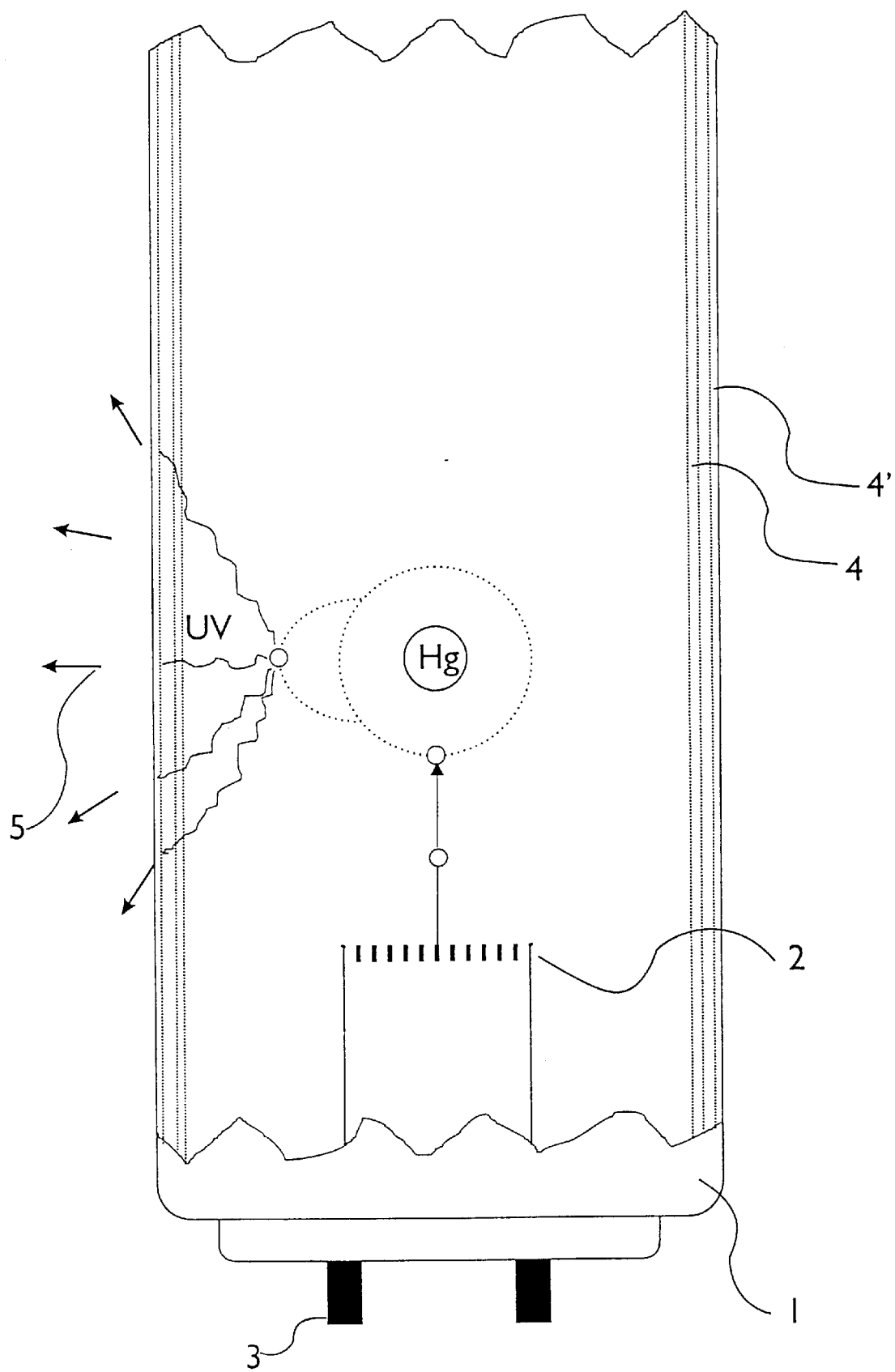

SOFT-TONE FLUORESCENT LAMP

FIELD OF THE INVENTION

The invention relates to a gas discharge lamp, particularly a fluorescent lamp, comprising a gastight, transparent lamp envelope including a filling gas containing mercury and a phosphor coating, and comprising two electrodes.

BACKGROUND OF THE INVENTION

The generation of light in gas discharge lamps is based on a process wherein charge carriers, in particular electrons, but also ions, are accelerated so strongly by an electric field between the electrodes of the lamps that collisions with the gas atoms or molecules in the filling gas of the lamps cause these gas atoms or molecules to be excited or ionized. When the atoms return to the ground state, and also in the case of the recombination of electrons and ions, a more or less substantial part of the potential energy is converted to radiation.

Fluorescent lamps are low-pressure gas discharge lamps comprising a gas filling containing mercury and a phosphor coating on the lamp vessel. The spectrum of the radiation emitted by mercury comprises, in addition to a proportion of visible light, a very large proportion of UV radiation which is invisible to the human eye. This UV radiation impinges on the phosphor or the phosphor mixture on the inner surface of the lamp envelope. The phosphors absorb the radiation and emit radiation of a longer wavelength, i.e. visible light, instead. The chemical composition of the phosphor coating determines the spectrum of the visible light generated and hence the color temperature thereof. By a suitable choice of the phosphors, it becomes possible to give the light of the fluorescent lamp any desired color. The visible color depends upon the intensity ratio in the wavelength spectrum of the radiation generated; the brightness is determined by the overall intensity.

To generate white light, use is made of special phosphors or phosphor mixtures whose radiation is particularly intense in the red, green and blue spectral ranges, resulting in the light being perceived as "white" light. For example, conventional tri-phosphorus fluorescent lamps comprise the triphosphors $BaMgAl_{10}O_{17}$:EU(BAM) having an emission band at 450 nm, $CeMgAl_{11}O_{19}$:Tb(CAT) having an emission band at 545 nm and $Y_2O_3$:Eu(YOX) having an emission band at 612 nm. The emitted wavelengths of the three triphosphors are each near the angular points of the CIE standard chromaticity diagram and sum up to an emission spectrum whose color point comes close to that of a black body. While the color rendering index CRI of a black body is standardized on 100 at each temperature, the color rendering index of tri-phosphorus fluorescent lamps ranges approximately from 80 to 95.

Fluorescent lamps are manufactured in three color temperature ranges, namely daylight white with a color temperature in the range from 5,000 to 6,000 K, neutral white with a color temperature in the range from 4,000 to 4,300 K and soft-white with a color temperature in the range from 2,700 to 3,200 K.

However, fluorescent lamps of an even softer light color with a color temperature below 2700 K are also in demand, which demand has hitherto been met by incandescent lamps having said highly appreciated light color. Such a color temperature cannot be attained by means of a triphosphor mixture. To attain low color temperatures, a part of the visible blue Hg radiation at 400 to 450 nm must be removed from the wavelength spectrum. This can be achieved in known manner by means of a Cer-activated aluminate phosphor, a magnesium-germanate phosphor or yttrium-aluminium-granate (YAG) (Kirk-Othmer, Encyclopedia of Chemical Technology, $4^{th}$ edition, New York, Interscience, vol. 15. p. 580). A fundamental drawback of these phosphors is their small absorptivity.

SUMMARY OF THE INVENTION

Therefore, it is an object of the invention to provide a gas discharge lamp, in particular a fluorescent lamp, comprising a gastight, transparent lamp envelope including a filling gas containing mercury and a phosphor coating, and comprising two electrodes, which gas discharge lamp emits soft-tone light, has a high color rendering index and can be manufactured in a cost-effective manner.

In accordance with the invention, this object is achieved by a gas discharge lamp comprising a gastight, transparent lamp envelope including a filling gas containing mercury and a first phosphor coating, and comprising two electrodes, the first phosphor coating containing a perylene pigment. The perylene pigment in the phosphor coating acts as a color converter. It absorbs the mercury radiation in the blue and near UV range at 436 and 405 nm, and emits radiation in the longer wavelength range extending from green via yellow to red. The perylene pigments combine a very good absorptivity in the blue and near UV range with a high absorption coefficient $\epsilon=100,000$ l/cm·mol and an emission-quantum yield>90%. Unlike other organic color pigments, they are not decomposed by UV radiation.

Within the scope of the invention, it is preferred that the first phosphor coating additionally contains a triphosphor mixture.

It is particularly preferred that the gas discharge lamp comprises a second phosphor coating containing a triphosphor mixture.

It is more particularly preferred that the second phosphor coating comprises $BaMgAl_{10}O_{17}$:Eu, $CeMgAl_{11}O_{19}$:Tb and $Y_2O_3$:Eu. This gas discharge lamp enables a color temperature below 2700 K to be attained at a color rendering index above 90.

It may also be preferred that the first phosphor coating contains organic polymers. Perylene pigments can be readily dispersed in organic polymers, where they form a coating which also increases the breaking strength of glass.

It is particularly preferred that the first phosphor coating contains N,N'-bis (2,6-diisopropyl phenyl) perylene-3,4,:9, 10 tetracarboxylic acid diimide. In a layer thickness of 1 mm, this perylene pigment absorbs 99% of the Hg emission at 436 nm and 50% of the Hg emission at 405 nm.

If the first phosphor coating contains two perylene pigments, a double color conversion can be attained.

Within the scope of the present invention, it is preferred that the gas discharge lamp comprises a phosphor coating containing a triphosphor mixture.

BRIEF DESCRIPTION OF THE DRAWINGS

These and other aspects of the invention will be apparent from and elucidated with reference to the embodiment(s) described hereinafter.

In the drawings:

FIG. 1 shows the generation of light in a fluorescent lamp comprising two phosphor coatings.

DETAILED DESCRIPTION OF THE INVENTION

FIG. 1 shows, by way of example, a low-pressure gas discharge lamp comprising a mercury filling, i.e. a fluorescent lamp. Such a gas discharge lamp is composed of a rod, ring or U-shaped tubular glass envelope 1. At the ends of the tube there are electrodes 2. For the connection use is made of dual-pin caps 3. The outer surface of the glass envelope is provided with a first phosphor coating 4' containing a perylene pigment. The inner surface of the glass tube is provided with a second phosphor coating 4, which contains a triphosphor mixture. The chemical composition of the first and the second phosphor layer jointly determine the spectrum of the light or its shade of color. Apart from an inert gas filling of argon, the glass tube contains a small quantity of mercury or mercury vapor which, when rendered luminescent under operating conditions, emits the Hg resonance lines at wavelengths of 185.0 nm, 253.7 nm, 406 nm and 436 nm. The UV radiation emitted excites the phosphors in the phosphor coatings, thereby causing them to emit light in the visible range 5.

The lamp also comprises means for igniting and for operating, for example a fluorescent lamp ballast and a starter.

The second phosphor coating 4 comprises a phosphor or a phosphor mixture to generate white light. Suitable phosphors are calcium halophosphate $Ca_5(PO_4)_3(F,Cl):Sb^{3+}$, $Mn^{2+}$, either alone or in a mixture comprising also strontium magnesium phosphate $(Sr,Mg)_3(PO_4)_2:Sn^{2+}$, calcium metasilicate $CaSiO_3:Pb^{2+},Mn^{2+}$ or magnesium arsenate $Mg_6As_2O_{11}:Mn^{4+}$, strontium halogen phosphate $Sr_5(PO_4)_3(F,Cl):Sb^{3+}$ or calcium tungstate $CaWO_4:Pb^{2+}$ as well as the conventional triphosphor mixture of $Ba\ MgAl_{10}O_{17}:Eu$, $CeMgAl_{11}O_{19}:Tb$ and $Y_2O_3:Eu$, either alone or mixed with other phosphors.

The first phosphor coating 4' comprises a perylene pigment. The perylene pigments are derived from 3,4,9,19-perylene tetracarboxylic acid. Particularly suitable are the orange N,N'-bis(2,6-diisopropyl phenyl)perylene-3,4,9,10-tetracarboxylic acid diimide and the red N,N'-bis(2,6-diisopropyl phenyl)-1,6,7,12,-tetraphenoxy perylene-3,4,9,10-tetracarboxylic acid diimide.

The first phosphor coating may alternatively comprise two or more perylene pigments. By way of example, a perylene pigment having a very good absorption of the Hg emission at 436 nm can be combined with a perylene pigment having a very good absorption of the Hg emission at 406 nm.

A further reduction of the color temperature is also achieved when a perylene pigment, which has a good absorption in the range round 400 nm and which emits in the bluish-green spectral range, is combined with a further perylene pigment, which absorbs the bluish-green radiation and emits in the yellow range.

The perylene pigment dissolves in many organic polymers, for example in epoxy resins, polycarbonates and polymethylmethacrylates. Polymethylmethacrylate is particularly suitable. The phosphor coating thus preferably comprises a first phosphor coating of 0.2 to 5% perylene pigment in polymethylmethacrylate on the outer wall of the container and an interior, further phosphor coating which contains the other lamp phosphors. Alternatively, the phosphor coating may be composed of a first phosphor coating of 0.2 to 5% perylene pigment in polymethylmethacrylate on the inner wall of the container and an interior, further phosphor coating comprising the other lamp phosphors.

EXAMPLE

A quantity of 0.05 g N,N'-bis(2,6-diisopropyl phenyl) perylene-3,4,9,10-tetracarboxylic acid diimide are dissolved with 25 g polymethylmethacrylate in 100 ml acetone. A quantity of 10 ml of this solution is applied to the outer glass wall of a lamp envelope and subsequently dried so as to form a 500 nm thick layer. For the layer comprising conventional phosphors, $BaMgAl_{10}O_{17}:Eu$, $CeMgAl_{11}O_{19}:Tb$ and $Y_2O_3:Eu$ are suspended in butylacetate containing a dispersing agent and applied to the inner surface of the pre-coated lamp envelope by means of a flow coating process and subsequently burnt out at 400° C. The lamp has a color temperature of 1800 K.

What is claimed is:

1. A gas discharge lamp comprising a gastight, transparent lamp envelope including a filling gas containing mercury and a first phosphor coating, and comprising two electrodes, the first phosphor coating containing a perylene pigment and a triphosphor mixture.

2. A gas discharge lamp comprising a gastight, transparent lamp envelope including a filling gas containing mercury, a first phosphor coating, two electrodes, and a second phosphor coating containing a triphosphor mixture, wherein the first phosphor coating contains a perylene pigment.

3. A gas discharge lamp as claimed in claim 2, wherein the first phosphor coating further contains organic polymers.

4. A gas discharge lamp comprising a gastight, transparent lamp envelope including a filling gas containing mercury, a first phosphor coating, a second phosphor coating, and two electrodes, wherein the first phosphor coating contains a perylene pigment and the second phosphor coating comprises $BaMgAl_{10}O_{17}:Eu$, $LaPO_4:CeTb$ and $Y_2O_3:Eu$.

5. A gas discharge lamp as claimed in claim 2, wherein the first phosphor coating contains N,N'-bis(2,6-diisopropyl phenyl)perylene-3,4,:9,10 tetracarboxylic acid diimide.

6. A gas discharge lamp comprising a gastight; transparent lamp envelope including a filling gas containing mercury and a first phosphor coating, and comprising two electrodes, the first phosphor coating containing two perylene pigments.

7. A gas discharge lamp comprising a gastight, transparent lamp envelope including a filling gas containing mercury and a first phosphor coating, and comprising two electrodes, the first phosphor coating containing a triphosphor mixture and N,N'-bis(2,6-diisopropyl phenyl)perylene-3,4,:9,10 tetracarboxylic acid diimide.

* * * * *